United States Patent Office 3,732,189
Patented May 8, 1973

3,732,189
METHOD FOR MAKING POLYIMIDES AND
PRODUCTS PRODUCED THEREBY
James V. Crivello, Mechanicville, and Ann L. Seidenspinner, Burnt Hills, N.Y., assignors to General Electric Company
No Drawing. Filed Mar. 27, 1970, Ser. No. 23,492
Int. Cl. C08g 20/00
U.S. Cl. 260—78 UA                3 Claims

ABSTRACT OF THE DISCLOSURE

A method for making polyimide polymers is provided by effecting reaction between an aliphatically unsaturated anhydride, such as maleic anhydride, and an aryl diamine, for example 4,4'-diaminodiphenylmethane in the presence of certain acidic catalysts, such as an organic carboxylic acid. The polyimides produced by the subject method exhibit superior heat resistance, and are useful as molding compounds, laminating resins, etc.

---

The present invention relates to polyimides and a method for making them which comprises (1) effecting contact between an organic polyamine and an unsaturated anhydride of the formula, (1)
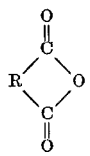

in the presence of an effective amount of an acidic catalyst to produce a polyimide, where R is an aliphatically unsaturated divalent organo radical, for example,

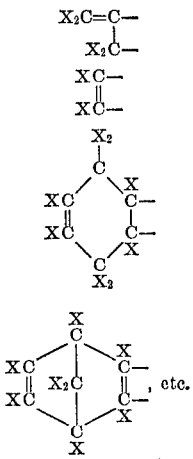

where X is a radical selected from hydrogen, lower alkyl, halogen, or mixtures thereof, such as chloro, methyl, ethyl, propyl, bromo, etc. In instances where the R radicals have isolated double bonds which are not activated, a reduced rate of addition with the polyamine has been found to occur.

Some of the organic polyamines which can be employed in the practice of the invention are included by the formula, (2)        NH₂R'NH₂ where R' is a diorgano radical, for example a heterocyclic radical, an arylene radical having from 6 to 15 carbon atoms, and YGY, where Y is arylene, such as phenylene, toluene, anthrylene, arylenealkylene, such as phenyleneethylene, etc., G is a divalent organo radical selected from alkylene radicals having from 1 to 10 carbon atoms, —O—, —S—, SO₂,

where Z is selected from methyl and trihalomethyl such as trifluoromethyl, trichloromethyl, etc.

There also is provided by the present invention, polyimides consisting essentially of at least a major amount of units of the formula, (3)
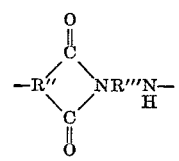

chemically combined with units of the formula, (4)
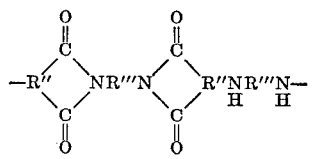

where R is as previously defined, and R" is a divalent organo radical free of aliphatic unsaturation, and R''' is a polyvalent organo radical selected from R' radicals and polyvalent organo radicals derived from polyamines.

Radicals included by R" are radicals derived from R, which are free of aliphatic unsaturation as a result of amine addition across the double bond. Radicals included by R''', in addition to R' radicals as previously defined are polyvalent organo radicals such as trisubstituted phenyl radicals, tetrasubstituted phenyl radicals, trisubstituted triazines, trisubstituted naphthalenes, etc., such as

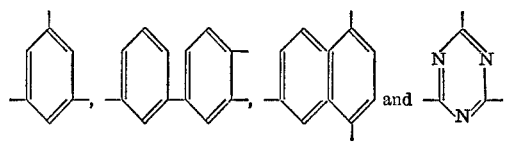

Among the preferred polyimides provided by the method of the present invention, are polyimides having at least a major proportion, i.e., at least about 50 mole percent, and up to 100 mole percent of chemically combined units of the formula, (5)
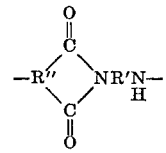

and from 0 to about 50 mole percent of chemically combined units of the formula, (6)
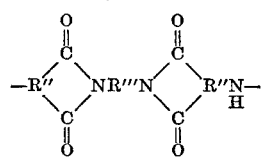

based on the total moles of units of Formulas 5 and 6.

In the above formulas, where R, R', R" and R''' respectively can represent more than one radical, these radicals can be all the same or any two or more of the aforementioned radicals.

Some of the preferred polyimides of the invention can consist of at least a major amount of chemically combined units such as,

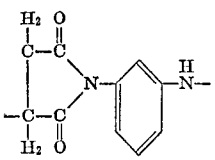

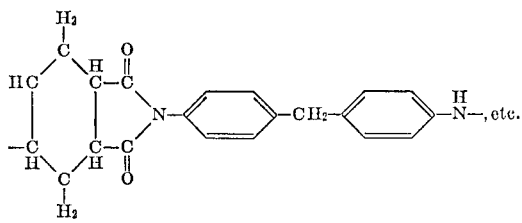

The polymers of the present invention can have intrinsic viscosities in DMF at 25° C. between 0.01 to 1 dl./g. These polymers can be employed as paints, laminates, thermosetting resins, adhesives, coatings, binders, wire varnishes, etc. Two applications of special interest are in the areas of thermosetting molding compounds and laminating resins. Catalysts can be employed, such as from 1 to 5 percent by weight of a free radical catalyst, for example dicumyl peroxide, or anionic catalysts to cure the resins made by the method of the invention. The addition of catalysts is not necessary, when high temperatures such as above 200° C. is employed during fabrication. When the above resin is used to impregnate glass cloth, laminates having desirable properties may be made by heating layers of the impregnate under pressure at temperatures from 180–300° C.

Some of the organic diamines which can be employed in the practice of the invention such as those of Formula 2 are, for example, meta-phenylene diamine; p-phenylene diamine; 4,4'-diamino-diphenyl propane; 4,4'-diamino-diphenyl methane; benzidine; 4,4'-diamino-diphenyl sulfide; 4,4'-diamino-diphenyl sulfone; 3,3'-diamino-diphenyl sulfone; 4,4'-diamino-diphenyl ether; 2,6-diamino pyridine; tris(4 - aminophenyl)phosphine oxide; bis(4 - aminophenyl)-N-methylamine; 1,5-diamino-naphthalene; 3,3'-dimethyl-4,4'-diamino-diphenyl; 3,3'-dimethoxy benzidine; 2,5-diamino - 1,3,4 - oxadiazole; 1,3,5-triamino-benzene, 1,3,5-triaminonaphthalene, melamine, benzoguanamine; 3,3',4,4'-tetraaminobiphenyl.

Some of the unsaturated anhydrides which can be employed are, for example, maleic anhydride, citraconic anhydride, itaconic anhydride, tetrahydrophthalic anhydride, endomethylenetetrahydrophthalic anhydride or "Nadic anhydride"; also known as endo-cis-5-norbornene-2,3-dicarboxylic anhydride, methyl-substituted and halogen-substituted nadic anhydrides, for instance hexachloro-endomethylenetetrahydrophthalic anhydride, etc.

Included by the acid catalysts which can be employed in the practice of the invention are, for example, organic carboxylic acids such as acetic acid, propionic acid, chloroacetic acid, trifluoroacetic acid, trichloroacetic acid, organic dicarboxylic acids as maleic acid, succinic acid, oxalic acid, etc., inorganic acids among which are perchloric acid, fluoroboric acid, hydroiodic acid, and hydrobromic acid.

In the practice of the invention, the aliphatically unsaturated anhydride or "anhydride" and the organic diamine, or "diamine", are contacted in the presence of an effective amount of the acid catalyst while maintaining a temperature in the range of between about 25° C. to 250° C.

The proportion of anhydride to diamine can vary widely. Effective results can be achieved if from 0.1 to 10 moles of diamine, per mole of anhydride is employed and preferably from 0.5 to 2 moles if diamine per mole of the anhydride. As little as 0.1 percent by weight of acid catalyst to a major amount of acid catalyst can be employed based on the weight of mixture.

Experience has shown that desirable results can be achieved with organic solvents. However, the acid catalyst can be employed as the solvent. Suitable organic solvents which can be used with the acid catalyst are benzonitrile, nitrobenzene, dimethylformamide, dimethylacetamide, dimethylsulfoxide, N-methylpyrrolidine, acetic acid, propionic acid, acetonitrile, dichlorobenzene, 1,4-dioxane, nitromethane, anisole, diphenylether, cresol, etc. The organic solvent can be employed to facilitate contact between the reactants and to recover the final product.

At temperatures in the range of between 80° C. to 115° C. reaction time can be as long as 1 to 15 hours or less. In some instances, depending upon such factors as the reactants and the acid catalyst employed, effective results can be achieved at room temperature.

Recovery of the polymer can be effected by standard methods such as precipitation by pouring the reaction mixture into appropriate media, such as methanol, ethanol, water, benzene, etc.

The polymers provided by the method of the present invention can be blended with inorganic fillers at up to 75 percent by weight or higher of the resulting blend. For example, blends of the polyimides and inorganic fillers such as silica, glass fibers, graphite, carbon fibers, asbestos, titanium oxide can be cured with organic peroxides at up to 5 percent by weight of the blend. Organic peroxides such as dicumyl peroxide, benzoyl peroxide, tertiary butyl perbenzoate, cumene hydroperoxide, etc. can be employed. The resulting compositions can be molded to make bearings, automobile parts, etc.

In order that those skilled in the art will be better able to practice the invention, the following examples are given by way of illustration and not by way of limitation. All parts are by weight.

EXAMPLE 1

There was stirred at ambient temperatures, a mixture of 49 parts maleic anhydride, 99 parts 4,4'-diaminodiphenyl methane and 500 parts glacial acetic acid. Immediate reaction occurred resulting in the production of a bright yellow precipitate. The mixture was then refluxed for three hours at a temperature of about 115° C. A solution was initially formed during reflux. After about ½ hour, a pale yellow resin began to precipitate. The mixture was poured into 2000 parts distilled water. A fine pale yellow powder precipitated which was then filtered and washed with water. It was dried in a vacuum oven for 24 hours. There was obtained 149.5 parts, a quantitative yield of product. Based on method of preparation and nuclear magnetic resonance spectra, the product was a polyimide consising essentially of chemically combined units of the formula,

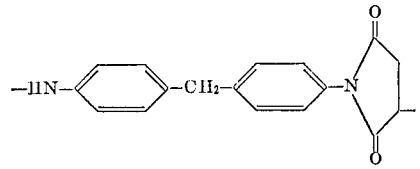

A blend of 99 parts of the above resin and 1 part dicumyl peroxide was molded to a test bar at 200° C. and 1000 p.s.i. The molded bar exhibited superior shear modulus indicating it would be useful in making automotive parts.

EXAMPLE 2

When the above reaction was carried out for 6 hours using 59 parts maleic anhydride, 79 parts 4,4'-diaminodiphenyl methane and 500 parts acetic acid, a quantitative yield of polymer was obtained. Based on elemental analysis, and method of preparation, the polymer consisted of chemically combined units having the same formula as in Example 1.

A 25 percent solution in dimethylformamide of the above polyimide is employed to impregnate heat cleaned glass cloth by immersing the cloth in the solution. The cloth is then allowed to air dry. The procedure is repeated until several treated glass cloths are obtained. A laminate is then fabricated by heating a stack of the impregnated cloth to 250° C. while under the pressure of 1000 p.s.i.

EXAMPLE 3

There was stirred a mixture of 26 parts p-phenylenediamine, 24 parts maleic anhydride, and 40 parts glacial acetic acid. A bright orange precipitate was formed. The mixture was heated to reflux and during the following four hours the color gradually shifted to yellow. The mixture was poured into 1200 parts water and a fine yellow precipitate was collected by filtration and washed with water. After drying for 15 hours 40.8 parts, a 90.4 percent yield of a pale yellow resin was obtained. Based on method of preparation, the product was a polyimide consisting of a major amount of chemically combined units of the formula,

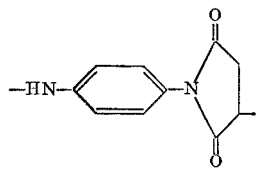

chemically combined with a minor amount of

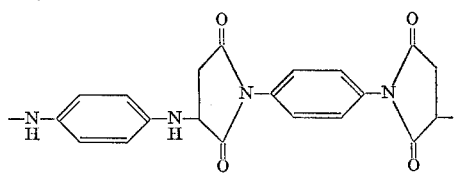

units.

The above resin is blended within 25 percent by weight of graphite and 5 percent by weight of the mixture of dicumyl peroxide. The product is molded to a test bar at 240° C. and 1000 p.s.i. It shows that the resin is useful for making bearing materials.

EXAMPLE 4

In accordance with the method of Example 1, recited above, a mixture of 22 parts maleic anhydride, 30 parts 4,4'-diaminodiphenyl ether and 500 parts glacial acetic acid was reacted together for five hours at reflux. There was obtained, 43 parts, an 89.6 percent yield, of a pale yellow resin. The resin had a softening point of 135–145° C. Based on method of preparation, the resin was a polyimide consisting of a major amount of units of the formula,

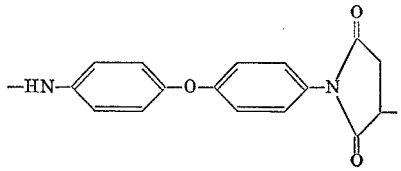

chemically combined with a minor amount of the following chemically combined units,

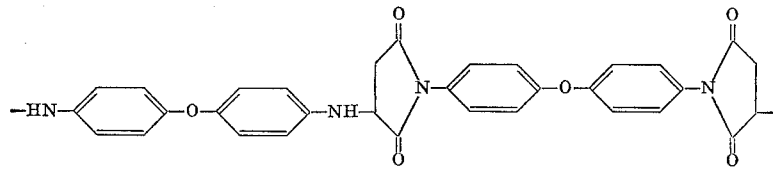

EXAMPLE 5

Following the same procedure, a mixture of 59 parts maleic anhydride, 99 parts 4,4'-diaminodiphenyl sulfone and 1500 parts glacial acetic acid provided 132 parts, or 89.7 percent yield of resin. The resin had a softening point of 120–130° C. and consisted of major amount of units of the formula,

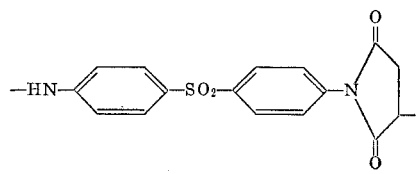

chemically combined with a minor amount of units of the formula,

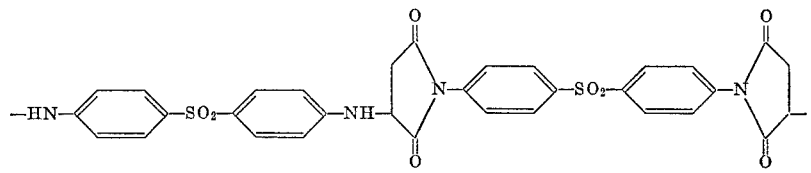

Although the above examples are directed to only a few of the very many polyimides which can be made by the method of the present invention, it should be understood that the present invention is directed to a much broader class of polyimides having chemically combined units shown by Formula 3 which can be chemically combined with a minor amount of units of Formula 4 and to methods for making such polyimides.

We claim:

1. A method for making resinous polyimide which comprises contacting from about 0.5 to 2 moles of (1) arylene diamine per mole of (2) an unsaturated anhydride of the formula,

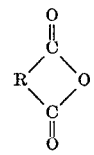

in the presence of a catalytic amount of acetic acid where R is an aliphatically unsaturated hydrocarbon radical.

2. A method in accordance with claim 1, wherein the organic polyamine is 4,4'-diaminodiphenyl methane.

3. A method in accordance with claim 1, where the unsaturated anhydride is maleic anhydride.

References Cited

UNITED STATES PATENTS

| | | | |
|---|---|---|---|
| 2,306,918 | 12/1942 | Weiss et al. | 260—78 UA |
| 2,818,405 | 12/1957 | Kovacic | 260—78 UA |
| 3,562,223 | 2/1971 | Bargain et al. | 260—78 UA |
| 3,652,511 | 3/1972 | Vincent et al. | 260—78 UA |
| 3,669,930 | 6/1972 | Asahara et al. | 260—78 UA |

HAROLD D. ANDERSON, Primary Examiner

U.S. Cl. X.R.

117—124 E; 161—197, 203; 260—32.6 N, 41 R, 47 CZ, 47 UA, 78 TF